(12) United States Patent
Umnov (10) Patent No.: US 8,488,959 B2
(45) Date of Patent: Jul. 16, 2013

(54) METHOD AND SYSTEM FOR MONITORING OPTICAL CHANNELS

(75) Inventor: Alexander Umnov, Sachse, TX (US)

(73) Assignee: Fujitsu Limited, Kawasaki-shi (JP)

(*) Notice: Subject to any disclaimer, the term of this patent is extended or adjusted under 35 U.S.C. 154(b) by 372 days.

(21) Appl. No.: 13/006,102

(22) Filed: Jan. 13, 2011

(65) Prior Publication Data

US 2012/0183305 A1 Jul. 19, 2012

(51) Int. Cl.
*H04B 10/18* (2006.01)
*H04B 10/08* (2006.01)

(52) U.S. Cl.
USPC .............. 398/16; 398/29; 398/33; 398/147

(58) Field of Classification Search
USPC .............. 398/16, 25–33, 147–150, 159
See application file for complete search history.

(56) References Cited

U.S. PATENT DOCUMENTS

| | | | |
|---|---|---|---|
| 2005/0175353 A1* | 8/2005 | Morgan | 398/149 |
| 2011/0150477 A1* | 6/2011 | Winzer | 398/65 |
| 2012/0020659 A1* | 1/2012 | Ibragimov et al. | 398/16 |

OTHER PUBLICATIONS

Hernday, Paul, "Measuring the Group Delay Characteristics of Narrow-Band Devices by the Modulation Phase Shift Method," An Applications Engineering White Paper, Agilent Technologies, 10 pages, Apr. 20, 2002.
Wagemann, Ulrich, "8191A Photonic All-parameter Analyzer," Preliminary Product Note, Agilent Technologies, 6 pages, Jun. 10, 2002.
Umnov, Alexander et al., U.S. Appl. No. 12/611,670 "Method and System for Monitoring Optical Dispersion in an Optical Signal," 24 pages, Nov. 3, 2009.

* cited by examiner

*Primary Examiner* — Leslie Pascal
(74) *Attorney, Agent, or Firm* — Baker Botts L.L.P.

(57) ABSTRACT

In accordance with one embodiment of the present disclosure, a system for optical signal dispersion and parameter monitoring comprises a tunable filter configured to filter a portion of one channel of an optical signal. The system comprises a polarization beam splitter configured to split the portion into first and second polarization beams and further comprises first and second photodetectors configured to respectively convert the first and second polarization beams into first and second electrical signals. Also, the system comprises a control unit configured to determine optical dispersion in the portion based on the first and second electrical signals when the portion includes a test signal. The control unit is configured to determine optical signal parameters of the portion such as channel power, channel wavelength, optical spectrum analysis (OSA) and optical signal-to-noise ratio (OSNR) based on the first and second electrical signals when the portion does not include the test signal.

21 Claims, 3 Drawing Sheets

METHOD AND SYSTEM FOR MONITORING OPTICAL CHANNELS

TECHNICAL FIELD OF THE DISCLOSURE

The present disclosure relates generally to optical networks and, more particularly, to a method and system for monitoring optical channels.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity.

An optical signal comprised of disparate wavelengths and modes may experience optical dispersion. Optical dispersion is an often undesirable phenomenon that causes the separation of an optical wave into spectral components with different frequencies. The separation of waves into spectral components with different frequencies may be referred to as chromatic dispersion (CD). Additionally, optical dispersion causes the separation of different modes (e.g., polarization states) of each frequency. The separation of waves according to the different modes of a frequency may be referred to as polarization mode dispersion (PMD). Optical dispersion may refer to both CD and PMD and occurs because the differing wavelengths and modes of wavelengths may propagate at differing speeds. The separation of an optical wave into its respective channels and modes due to optical dispersion may require optical dispersion compensation for the particular optical signal.

Additionally, optical signal parameters such as channel power, channel wavelength, and optical signal-to-noise ratio (OSNR) may vary among each channel due to the wavelengths of the channels being affected differently within an optical network. Accordingly, these parameters may also require monitoring for proper network operation.

SUMMARY

In accordance with one embodiment of the present disclosure, a system for optical signal dispersion and parameter monitoring comprises a tunable filter configured to receive an optical signal comprising a plurality of channels. The filter is further configured to filter a portion of one channel from the plurality of channels. During dispersion monitoring, the portion includes a test signal. The system further comprises a polarization beam splitter (PBS) coupled to the tunable filter and configured to receive the portion from the tunable filter and split the portion into a first polarization beam and a second polarization beam. The system also comprises a first photodetector coupled to the PBS and configured to receive the first polarization beam from the PBS and convert the first polarization beam into a first electrical signal. The system additionally comprises a second photodetector coupled to the PBS and configured to receive the second polarization beam from the PBS and convert the second polarization beam into a second electrical signal. Also, the system comprises a control unit coupled to the first photodetector and the second photodetector. The control unit is configured to receive the first and second electrical signals and determine optical dispersion in the portion based on the first and second electrical signals when the portion includes the test signal. The control unit is additionally configured to determine an optical signal parameter of the portion selected from the group consisting of channel power, channel wavelength, optical spectrum analysis (OSA) and optical signal-to-noise ratio (OSNR) based on the first and second electrical signals when the portion does not include the test signal.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
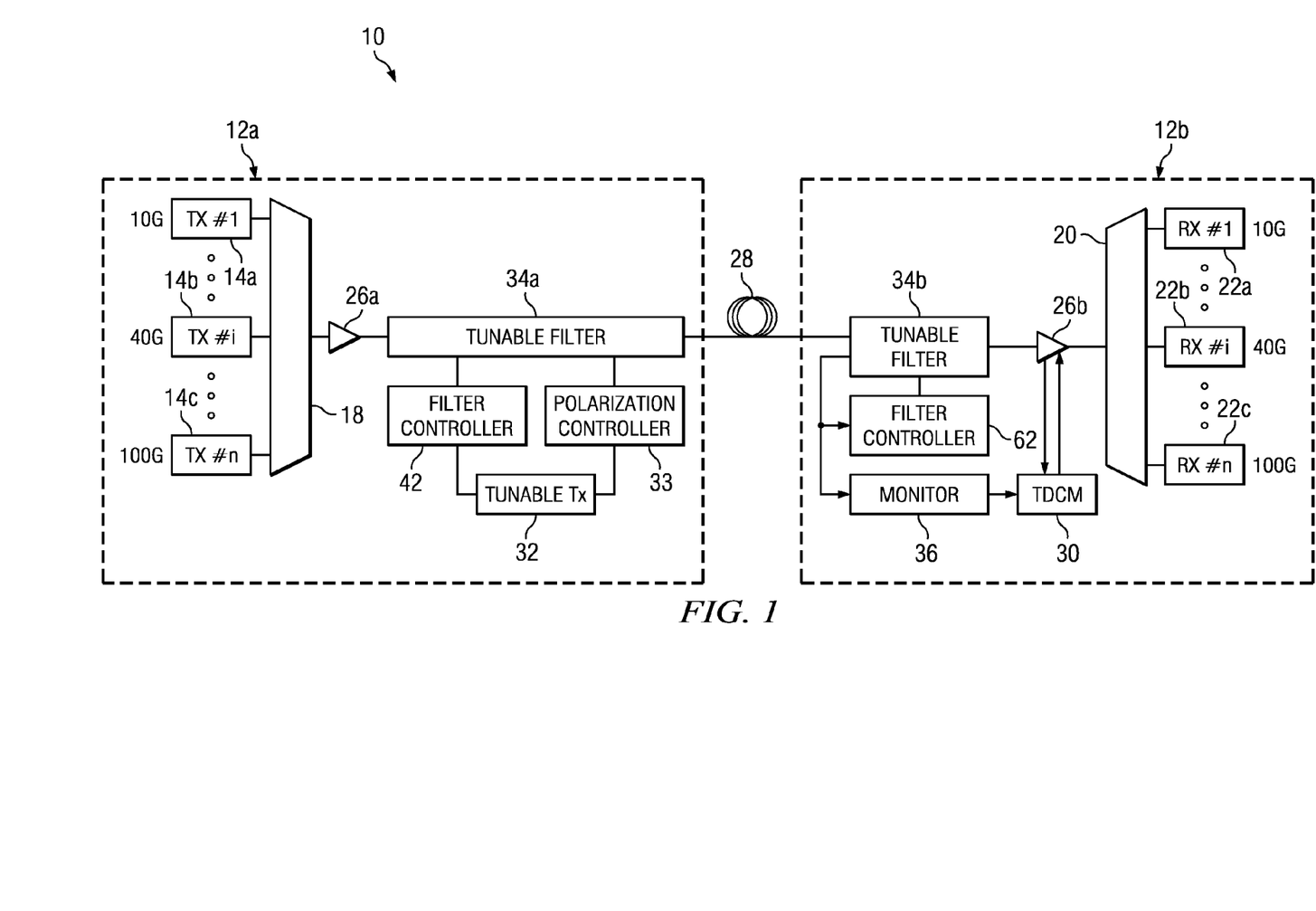
FIG. 1 is a block diagram illustrating one embodiment of an optical network including components for monitoring optical dispersion and optical signal parameters of optical channels.

FIG. 1 is a block diagram illustrating one embodiment of an optical network 10 including components for monitoring optical dispersion and optical signal parameters of optical channels. Optical network 10 may include one or more optical fibers 28 operable to transport one or more optical signals communicated by components of the optical network 10. The components of optical network 10, coupled together by optical fiber 28, include nodes 12a and 12b. Although the optical network 10 is shown as a point-to-point optical network with terminal nodes, the optical network 10 may also be configured as a ring optical network, a mesh optical network, or any other suitable optical network or combination of optical networks, and may include any number of nodes intermediate to nodes 12a and 12b. The optical network 10 may be used in a short-haul metropolitan network, a long-haul inter-city network, or any other suitable network or combination of networks.

Node 12a may include transmitters 14a, 14b and 14c, a multiplexer 18, an amplifier 26a, a tunable transmitter 32, a polarization controller 33 a filter controller 42 and a tunable filter 34a. Transmitters 14a, 14b and 14c may include any transmitter or other suitable device operable to transmit optical signals. Each transmitter 14a, 14b or 14c may be configured to receive information and transmit a modulated optical signal that includes the information at a certain range of wavelengths. In optical networking, each range of wavelengths may also be referred to as a channel. Each transmitter 14a, 14b or 14c may also be configured to transmit this optically encoded information on the associated wavelength. In the present embodiment and as discussed further below, transmitters 14a, 14b and 14c may be configured to transmit information at different bit rates (e.g., ten gigabits per second (Gb/s) for transmitter 14a, forty Gb/s for transmitter 14b and one hundred Gb/s for transmitter 14c). The information transmitted by transmitters 14a, 14b and 14c may be referred to as "traffic."

The multiplexer 18 may include any multiplexer or combination of multiplexers or other devices operable to combine different channels. Multiplexer 18 may be configured to receive and combine the disparate channels transmitted by transmitters 14a, 14b and 14c into an optical signal for communication along fibers 28.

Amplifier 26a may be used to amplify the multi-channeled signal. Amplifier 26a may be positioned before and/or after certain lengths of fiber 28. Amplifier 26a may comprise an optical repeater that amplifies the optical signal. This amplification may be performed without opto-electrical or electro-optical conversion. In particular embodiments, amplifier 26a may comprise an optical fiber doped with a rare-earth element. When a signal passes through the fiber, external energy may be applied to excite the atoms of the doped portion of the optical fiber, which increases the intensity of the optical signal. As an example, amplifier 26a may comprise an erbium-doped fiber amplifier (EDFA). However, any other suitable amplifier 26a may be used.

Tunable transmitter 32 may comprise any transmitter or other suitable device configured to transmit one or more test signals at one or more selected wavelengths that may be combined with the multi-channel signal amplified by amplifier 26a of node 12a. In the same or alternative embodiments, the optical signals transmitted by tunable transmitter 32 may be varied among one or more selected wavelengths. Polarization controller 33 may comprise any suitable system, apparatus or device configured to change the polarization of signals leaving tunable transmitter 32. In some embodiments, polarization controller 33 may be configured to change the polarization of the test signal, such that the polarization of the test signal cycles through a large number of polarization states. This changing and cycling through the various polarization states may be referred to as "scrambling" the polarization of the test signal.

Tunable filter 34a may include any filter or other suitable device configured to receive optical signals forwarded by polarization controller 33 and amplifier 26a of node 12a, remove or filter out one or more portions of a channel of the multi-channel signal from amplifier 26a, and combine the remaining multi-channel signal with the optical test signal from tunable filter 32. In some embodiments, the channels filtered from the multi-channel signal from amplifier 26a may be of the same wavelength as the one or more channels communicated from tunable transmitter 32. In the same or alternative embodiments, tunable filter 34a may be a Fabry-Perot etalon filter.

Filter controller 42 may be any device configured to track the wavelength or wavelengths of the test signal of tunable transmitter 32 and communicate control signals to tunable filter 34a based on the wavelength of the test signal. In turn, tunable filter 34a may be configured to remove or filter out a portion of a channel of the multi-channel signal received by tunable filter 34a from amplifier 26a based on the control signals communicated from filter controller 42, such that the filtered-out portion of the channel is of the wavelengths of the test signal generated by tunable transmitter 32. In some embodiments, filter controller 42 may receive a test signal from tunable transmitter 32 of node 12a, and based on the received test signal, may communicate control signals to tunable filter 34a.

The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring back to FIG. 1, node 12a in optical network 10 may be configured to transmit and multiplex disparate channels using WDM, DWDM, or some other suitable multi-channel multiplexing technique, and to amplify the multi-channel signal.

As discussed above, the amount of information that can be transmitted over an optical network varies directly with the number of optical channels coded with information and multiplexed into one signal. Therefore, an optical signal employing WDM may carry more information than an optical signal carrying information over solely one channel. An optical signal employing DWDM may carry even more information. Besides the number of channels carried, another factor that affects how much information can be transmitted over an optical network is the bit rate of transmission. The greater the bit rate, the more information may be transmitted.

Improvements and upgrades in optical network capacity generally involve either increasing the number of wavelengths multiplexed into one optical signal or increasing bit rates of information traveling on each wavelength. In either case, it is usually more cost-efficient to use, modify, or add to existing network components than to replace the entire optical system. For reasons relating to the cost of upgrading an optical system, upgrades sometimes occur in stages in which the network must support both new technologies that provide greater bandwidth and old technologies that provide less bandwidth.

Today, many existing networks transmit information at ten GB/s and modulate the optical signal using, for example, a non-return-to-zero (NRZ) modulation technique. Signal transmission upgrades include, for example, transmitting information at forty Gb/s using differential phase shift keying (DPSK) or differential quadrature phase shift keying (DQPSK) to modulate the optical signal. Since upgrading the entire optical network's transmitters would be cost-prohibitive for most optical network operators, many such operators have instead desired to upgrade their networks by incrementally replacing existing ten Gb/s NRZ transmitters with forty Gb/s DPSK or DQPSK transmitters (these types of transmitters being used only as examples). Recently, and in increasing numbers, optical systems are also including DQPSK transmitters capable of transmitting information at one hundred Gb/s.

Another challenge faced in upgrading optical networks to support higher bit rates is that of signal spectrum broadening. Signal spectrum broadening is a phenomenon by which the frequency spectrum of a signal becomes wider as the signal rate increases. For example, in some optical systems, an unmodulated signal may have a narrow signal spectrum of approximately 50 MHz, a ten Gb/s signal may have a signal spectrum of several GHz, a forty Gb/s signal may have a signal spectrum of tens of GHz and a one hundred Gb/s signal may have an even larger signal spectrum.

One challenge faced by those wishing to implement the cost-efficient strategy of integrating upgraded transmitters with existing transmitters is the challenge of optical dispersion monitoring and compensation. Even in existing WDM and DWDM networks, optical signals comprised of disparate wavelengths experience optical dispersion. Optical dispersion refers to the separation of an optical signal into its spectral components with different frequencies (e.g., chromatic dispersion (CD)), and also separation of a signal into its different modes (e.g., polarization mode dispersion (PMD)). Optical dispersion occurs because the differing wavelengths and modes propagate at differing velocities. As optical signals travel across existing optical networks and experience optical dispersion, they may receive appropriate optical dispersion compensation to achieve at least adequate performance. Specially designed dispersion compensation fibers have been developed to compensate for dispersion in an optical signal comprised of channels modulated using the same modulation technique. Additionally it is advantageous to monitor and measure parameters of optical signals (e.g., channel power, channel wavelength, optical signal-to-noise ratio (OSNR) and optical spectrum analysis (OSA)).

However, traditional approaches to optical dispersion monitoring and compensation, and optical signal parameter measuring may have many disadvantages. For example, dispersion compensation may be accomplished using fixed compensation approaches (e.g., dispersion compensating fibers) or "set and forget" approaches which may involve once-per-lifetime manual tuning These approaches are often undesirable as dispersion in an optical network may change due to temperature variations, mechanical vibrations, or other environmental conditions. Traditional dispersion monitors have not proven practicable because they require a dedicated light source and typically do not permit in-service monitoring (e.g., it is often required to take a network offline or out of service for monitoring). Additionally, dispersion monitoring and signal parameter monitoring are traditionally performed by separate components, which increases the number of components in the optical network and thus potentially increases the cost of the system.

As shown in FIG. 1, the WDM signal generated by node 12a may include sets of channels using different modulation formats. In particular, the WDM signal may comprise a set of channels communicating information at ten Gb/s using NRZ modulation and transmitted by transmitters 14a. The WDM signal may also include a set of channels communicating information at forty Gb/s using nPSK modulation and transmitted by transmitters 14b. The WDM signal may further include a set of channels communicating information at one hundred Gb/s using DQPSK modulation and transmitted by transmitters 14c.

However, the sets of disparate channels may communicate information at any suitable bit rate and/or using any suitable modulation technique. For example, one or more of the channels may communicate information at a rate of ten, twenty, forty, eighty, one hundred Gb/s, or any other suitable bit rate. One or more of the channels may additionally communicate information using a modulation technique such as return-to-zero (RZ), carrier suppressed return-to-zero (CS-RZ), NRZ, DPSK, DQPSK, or any other suitable modulation technique. As used herein, a "set" of channels may include one or more channels and does not imply any spatial or any other unspecified relationship among the channels (for example, the channels in a set need not be contiguous). In addition, as used herein, "information" may include any information communicated, stored, or sorted in the network. This information may have at least one characteristic modulated to encode audio, video, textual, real-time, non-real-time and/or other suitable data. Additionally, information communicated in optical network 10 may be structured in any appropriate manner including, but not limited to, being structured as frames, packets, or an unstructured bit stream.

The signal transmitted from node 12a may travel over one or more optical fibers 28 to node 12b. An optical fiber 28 may include, as appropriate, a single, unidirectional fiber; a single, bi-directional fiber; or a plurality of uni- or bi-directional fibers. Although this description focuses, for the sake of simplicity, on an embodiment of the optical network 10 that supports unidirectional traffic, the present disclosure further contemplates a bi-directional system that includes appropriately modified embodiments of the components described below to support the transmission of information in opposite directions along the optical network 10. Furthermore, as is discussed in more detail below, the fibers 28 may be high chromatic dispersion fibers (as an example only, standard single mode fiber (SSMF) or non-dispersion shifted fiber (NDSF)), low chromatic dispersion fibers (as an example only, non zero-dispersion-shifted fiber (NZ-DSF), such as E-LEAF fiber), or any other suitable fiber types. According to particular embodiments, different types of fiber 28 create the need for different dispersion compensation schemes to be applied to the signals, as discussed in further detail below.

Node 12b may be configured to receive signals transmitted over optical network 10. Node 12b may include an amplifier 26b and an associated tunable dispersion compensation monitor (TDCM) 30, a filter controller 62, a tunable filter 34b, a monitor 36, a demultiplexer 20, and receivers 22a, 22b and 22c. As described above, amplifier 26b may be used to amplify the WDM signal as it travels through the optical network 10.

TDCM 30 may include any tunable dispersion compensator (TDC), variable dispersion compensator (VDC), other dispersion compensating device configured to perform optical dispersion compensation on a signal or set of channels comprising a signal using one or more modulation techniques, or any combination of the foregoing. Although the optical network 10 shows TDCM 30 coupled to a respective amplifier 26b, TDCM 30 may also be positioned separately from amplifier 26b.

Tunable filter 34b may be an in-line filter and may include any filter or other suitable device configured to receive optical signals via fiber 28, remove or filter out one or more channels of the multi-channel signal received via fiber 28, and split the one or more filtered channels from the remaining multi-channel signal. In some embodiments, the channels filtered and split from the multi-channel signal received may be of the same wavelength as the one or more channels communicated from tunable transmitter 32. In the same or alternative embodiments, tunable filter 34b of node 12b may be a Fabry-Perot etalon filter.

Filter controller 62 may be any device configured to receive an optical signal originating from tunable transmitter 32 of node 12a, and based on the received optical signal, communicate control signals to tunable filter 34b. In some embodiments, filter controller 62 may be configured to track the wavelength of the test signal, wherein filter controller 62 may communicate control signals to tunable filter 34b such that tunable filter 34b is able to track the wavelength of the test signal communicated by tunable transmitter 32. In the same or alternative embodiments, filter controller 62 may communicate control signals to tunable filter 34b based on the signal originating from tunable transmitter 32. For example, tunable transmitter 32 may communicate an unmodulated signal or a modulated signal modulated differently than the multi-channel signal of node 12a and transmitted via fiber 28. Thus, filter controller 62 may be able to determine the signal originating from tunable transmitter 32 based on the modulation (or lack of modulation) of such signal, and accordingly communicate control signals to tunable filter 34b.

Monitor 36 may be configured to determine optical dispersion of optical signals in optical network 10, including both chromatic dispersion (CD) and polarization mode dispersion (PMD). In some embodiments, monitor 36 may communicate control signals to TDCM 30 in order to control the optical dispersion compensation that TDCM 30 performs on signals. Monitor 36 may also be configured to determine one or more parameters of optical signals (e.g., channel power, channel wavelength, OSNR and OSA for each channel). Accordingly, monitor 36 may reduce costs over traditional systems by performing dispersion monitoring and parameter monitoring whereas traditional systems typically include a separate dispersion monitoring component and a separate parameter monitoring component.

Demultiplexer 20 may include any demultiplexer or other device configured to separate the disparate channels multiplexed using WDM, DWDM, or other suitable multi-channel multiplexing technique. Demultiplexer 20 may be configured to receive an optical signal carrying a plurality of multiplexed channels, demultiplex the disparate channels in the optical signal, and pass the disparate channels to different receivers 22a, 22b, and 22c.

Receivers 22a, 22b, and 22c may include any receiver or other suitable device operable to receive an optical signal. Each receiver 22a, 22b, and 22c may be configured to receive a channel of an optical signal carrying encoded information and demodulate the information into an electrical signal. Additionally, each receive 22a, 22b and 22c may be configured to receive a signal transmitted at a particular bit rate by a corresponding transmitter 14a, 14b or 14c. In the present embodiment, each receiver 22a may be configured to receive a ten Gb/s signal transmitted by a corresponding transmitter 14a, each receiver 22b may be configured to receive a forty Gb/s signal transmitted by a corresponding transmitter 14b and each receiver 22c may be configured to receive a one hundred Gb/s signal transmitted by a corresponding transmitter 14c.

In operation, transmitters 14a, 14b and 14c of node 12a may transmit information at different bit rates and/or using different modulation techniques over different channels (e.g., ten Gb/s for transmitter 14a, forty Gb/s for transmitter 14b and one hundred GB/s for transmitter 14c). The multiplexer 18 may combine these different channels into an optical signal and communicate the signal over an optical fiber. An amplifier 26 may receive the optical signal, amplify the signal, and pass the signal over an optical fiber to tunable filter 34a.

During dispersion monitoring, tunable transmitter 32 of node 12a may transmit a test signal at a particular wavelength to tunable filter 34a, via polarization controller 33 and also to filter controller 42. The test signal may be transmitted at a wavelength to be monitored for dispersion within optical network 10. Tunable filter 34a may also receive the multi-channel signal from amplifier 26a of node 12a. Filter controller 42 may communicate control signals to tunable filter 34a to remove or filter out at least a portion of a channel of the multi-channel signal that is of the same wavelength of the test signal communicated from tunable transmitter 32. Additionally, filter controller 42 may communicate control signals to tunable filter 34a to replace the filtered portion of the multi-channel signal with the test signal from tunable transmitter 32. Accordingly, tunable filter 34a may substitute the traffic of a portion of a channel of the multi-channel signal with a test signal such that the portion includes the test signal. Additionally, tunable filter 34a may transmit the combined optical signal, including the test signal, via optical fiber 28. Optical fiber 28 may transport the signal to node 12b.

For PMD monitoring, tunable transmitter 32 may be configured to cycle through each channel of the optical signal to create test signals associated with each channel. The test signals may include information to aid in PMD monitoring such as expected signal wavelength shape and size. Additionally, filter controller 42 may be configured to communicate control signals to tunable filter 34a to also cycle through each channel at the same rate and channel as tunable transmitter 32. In some embodiments, tunable filter 34a may be configured to filter only a portion of a channel, and tunable transmitter 32 may transmit a test signal at a wavelength corresponding to the filtered portion of the channel. In such instances, tunable filter 34a and tunable transmitter 32 may cycle through a plurality of portions of a channel before cycling from one channel to the next. Further, polarization controller 33 may be configured to cycle through or scramble the polarization of each channel received from tunable transmitter 32 such that a test signal for each channel at various polarization states is generated. Polarization controller 33, tunable transmitter 32, filter controller 42 and tunable filter 34a may be configured such that polarization controller 33 cycles through the various polarization states multiple times (e.g., one hundred times) for any particular channel, before tunable transmitter 32 and tunable filter 34a move to another channel. Accordingly, an accurate measurement of PMD for each channel may be obtained based on the scrambled test signal for each channel.

For CD monitoring, tunable transmitter 32 may also transmit a test signal that contains information that aids in determining CD. Additionally, tunable transmitter 32, filter controller 42 and tunable filter 34a may be configured such that tunable transmitter 32 and tunable filter 34a cycle through each channel similarly to the cycling done for PMD monitoring. During CD monitoring, test signals corresponding to different channels are compared to determine CD for the WDM signal, which is in contrast to PMD monitoring where the polarization modes of test signals associated with each channel are compared to determine PMD for each channel. Accordingly, tunable transmitter 32 may cycle through the channels to create test signals that may be compared to obtain a CD measurement, whereas in PMD measuring tunable transmitter 32 may cycle through channels to determine a PMD measurement for each channel. However, because CD monitoring may not require comparing different polarization states within each channel, like PMD monitoring, the polarization scrambling may not be necessary to measure CD, whereas it may be needed to measure PMD. Therefore, polarization controller 33 may be configured such that the polarization of the channels is not scrambled during CD monitoring, as is done in PMD monitoring.

During dispersion monitoring (e.g., CD and PMD monitoring), filter controller 62 may be configured to track the wavelength of the test signal originating from tunable transmitter 32 and communicate control signals to tunable filter 34b to split a portion of the channel that includes the test signal from the remainder of the WDM signal. Accordingly, tunable filter 34b may transmit the test signal, originating from tunable transmitter 32, to monitor 36, and transmit the remainder of the multi-channel WDM signal to amplifier 26b of node 12b.

During monitoring of parameters other than dispersion (e.g., power, wavelength, OSA, OSNR, etc.), tunable transmitter 32 may be deactivated such that a test signal is not transmitted to allow for monitoring of the actual signal instead of a test signal. Further, filter controller 42 may direct tunable filter 34a to allow all channels of the WDM signal to pass through it without filtering a channel associated with a test signal. Therefore, while monitoring parameters other than dispersion, filter 34b may receive the entire multi-channel signal. Additionally, filter controller 62 may direct tunable filter 34b to scan through the various channels transmitted by transmitters 14a, 14b and 14c. As tunable filter 34b scans through the channels, tunable filter 34b may filter out and split a portion of a channel from the remainder of the multi-channel signal. Tunable filter 34b may transmit the portion of the channel to monitor 36 and transmit the remainder of the multi-channel signal to amplifier 26b.

During dispersion monitoring, monitor 36 may analyze the test signal originating from tunable transmitter 32 to measure the chromatic dispersion, polarization mode dispersion, and/or other dispersion experienced by the portion of the test signal. Based on the measured dispersion, monitor 36 may communicate control signals to TDCM 30. Based on the control signals communicated to TDCM 30 from monitor 36, TDCM 30 may perform optical dispersion compensation on the signal communicated to amplifier 26b from tunable filter 34b. During the monitoring of parameters other than dispersion, monitor 36 may analyze the signal to determine the power, wavelength, OSNR, OSA, or other parameters associated with one or more channels of the signal.

Amplifier 26b may amplify the communicated signal that is passed through tunable filter 34b. Demultiplexer 20 of node 12b may receive the signal, demultiplex the signal into the signal's constituent channels, and pass the signal's constituent channels. Each channel may be received by an associated receiver 22a, 22b or 22c of node 12b and be forwarded.

Advantageously, optical system 10 of FIG. 1, may overcome traditional approaches to optical dispersion monitoring and compensation, as it permits in-service, per-channel dispersion monitoring and compensation. For example, to monitor dispersion on a particular channel, a test signal having a wavelength of a particular channel may be communicated from tunable transmitter 32, and at least a portion of the channel, of the same wavelength as the test signal, may be filtered from the multi-channel signal communicated from amplifier 26a of node 12a.

In some embodiments, such filtering may be performed by filtering a narrow portion of the channel (e.g., the filter bandwidth may be more narrow than the modulated signal spectrum width). For example, a channel may have a width of 0.4 nanometers (nm) and the tunable filter may filter a 0.06 nm wide portion of the channel, thus leaving the channel largely undisturbed. In other embodiments, the portion may have a width of 0.01 nm, leaving even more of the channel undisturbed. The narrow filtering of a channel may be advantageous by filtering a small enough portion of the channel to allow the receiver associated with the channel to receive and interpret the information transmitted within the channel. Additionally, the test signal transmitted by tunable transmitter 32 may replace the filtered portion of the channel such that the remaining portion of the multi-channel signal may then be combined with the test signal and communicated to a node 12b comprising dispersion monitoring and compensation devices.

As mentioned above, filter controller 62 may be configured to track the test signal. Accordingly, filter controller 62 may be configured to direct tunable filter 34b to filter the portion of the channel that includes the test signal such that the test signal may then be filtered by tunable filter 34b of node 12b, and analyzed for optical dispersion for the particular channel. Therefore, all the other channels and the portion of the channel under consideration not filtered by tunable filter 34b may pass through to their respective receivers 22a, 22b and 22c. Accordingly, optical system 10 requires that only a portion of a single channel of a multi-channel signal be directed to an optical monitor for monitoring and compensation while the multi-channel signal remains in-service, including the channel with the portion that includes the test signal. Because only a portion of one channel is redirected to a monitor, the approaches set forth in this disclosure may lead to a largely negligible or minimal effect on network communication throughput.

In addition, when performing dispersion monitoring and compensation, the test signal of tunable transmitter 32 may be swept through numerous wavelengths, and the dispersion for each such channel may be monitored and compensated, allowing for the dispersion monitoring and compensation of multiple channels in the optical network, all the while requiring only a portion of one channel to be out-of-service at a time, again leading to a largely negligible or minimal effect on network communication throughput.

Also, during measurement of parameters other than dispersion, the narrow filtering of a portion of a channel may allow parameters such as OSNR, OSA, power and wavelength to be monitored with little to no effect on network communication. Further, by performing dispersion monitoring and other parameter monitoring with the same device, the cost of implementing monitoring systems may also be decreased.

Figure 2:
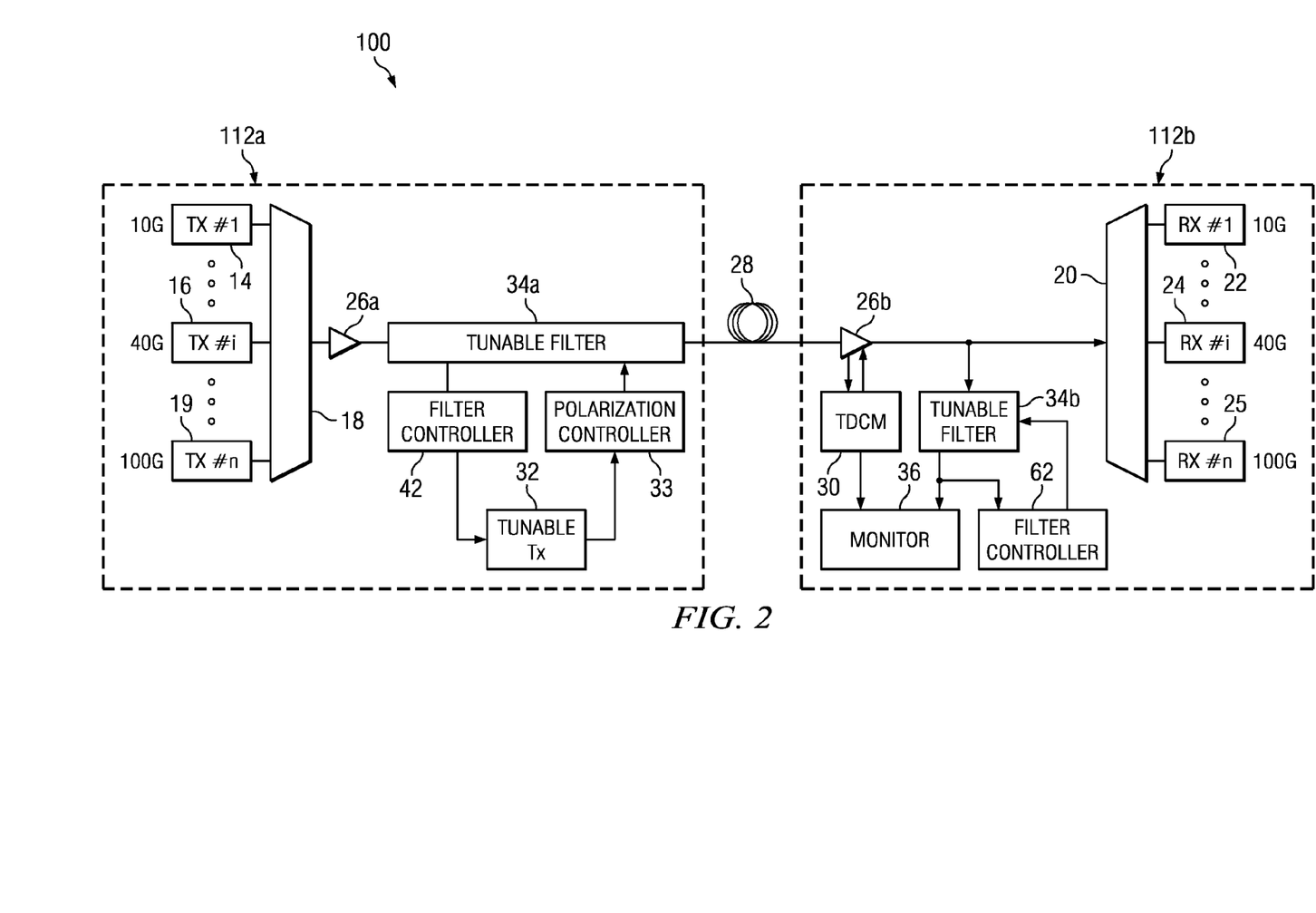
FIG. 2 is a block diagram illustrating another embodiment of an optical network including components for monitoring optical dispersion and optical signal parameters of optical channels.

FIG. 2 is a block diagram illustrating an embodiment of an optical network 100 including components for monitoring and compensation for optical dispersion. Optical network 100 is similar to that of optical network 10 of FIG. 1, with modifications. Accordingly, similar elements will not be described again with respect to FIG. 2.

Optical network 100 may include one or more optical fibers 28 operable to transport one or more optical signals communicated by components of the optical network 100. The components of optical network 100, coupled together by optical fiber 28, may include nodes 112a and 112b. Node 112a may be substantially similar to node 12a of FIG. 1. Node 112b may be similar to node 12b, except that node 112b may include a tap (not shown) configured to tap a percentage, such as two percent, of the WDM signal received from amplifier 26b. Node 112b may be configured such that tunable filter 34b receives the tapped portion of the WDM signal, while the untapped portion may bypass tunable filter 34b. Therefore, instead of being an in-line filter like tunable filter 34b of FIG. 1, tunable filter 34b of FIG. 2 may be an out-of-line filter.

Similar to filter controller 62 of node 12b described with respect to FIG. 1, filter controller 62 of node 112b in FIG. 2 may direct filter 34b of node 112b to filter a portion of the test signal originating from tunable transmitter 32. Monitor 36 may be configured to receive the filtered portion of the signal from tunable filter 34b that originated from tunable transmitter 32. Monitor 36 may analyze the portion of the test signal originating from tunable transmitter 32 to measure the chromatic dispersion, polarization mode dispersion, and/or other dispersion experienced by the portion of the signal. Based on the measured dispersion, monitor 36 may communicate control signals to TDCM 30. Based on the control signals communicated to TDCM 30 from monitor 36, TDCM 30 may perform optical dispersion compensation on the signal communicated to amplifier 26b from tunable filter 34.

In addition, filter controller 62 of node 112b may be configured to direct tunable filter 34b to filter a portion of the WDM signal originating from transmitters 14a, 14b and 14c. Monitor 36 may analyze the portion of the signal originating from the transmitters 14a, 14b and 14c to determine the parameters of the optical signal such as power, wavelength, OSNR, OSA, or other parameters associated with the signal.

As noted above, although optical networks 10 and 100 are shown as a point-to-point optical network with terminal nodes, one or more of optical networks 10 and 100 may also be configured as a ring optical network, a mesh optical network, or any other suitable optical network or combination of optical networks, and may include any suitable number of intermediate nodes interfaced between the terminal nodes.

It should be noted that although particular components have been shown, modifications, additions, or omissions may be made to the optical networks 10 and 100 without departing from the scope of the disclosure. The components of the optical networks 10 and 100 may be integrated or separated according to particular needs. Moreover, the operations of the optical networks 10 and 100 may be performed by more, fewer, or other components.

Figure 3:
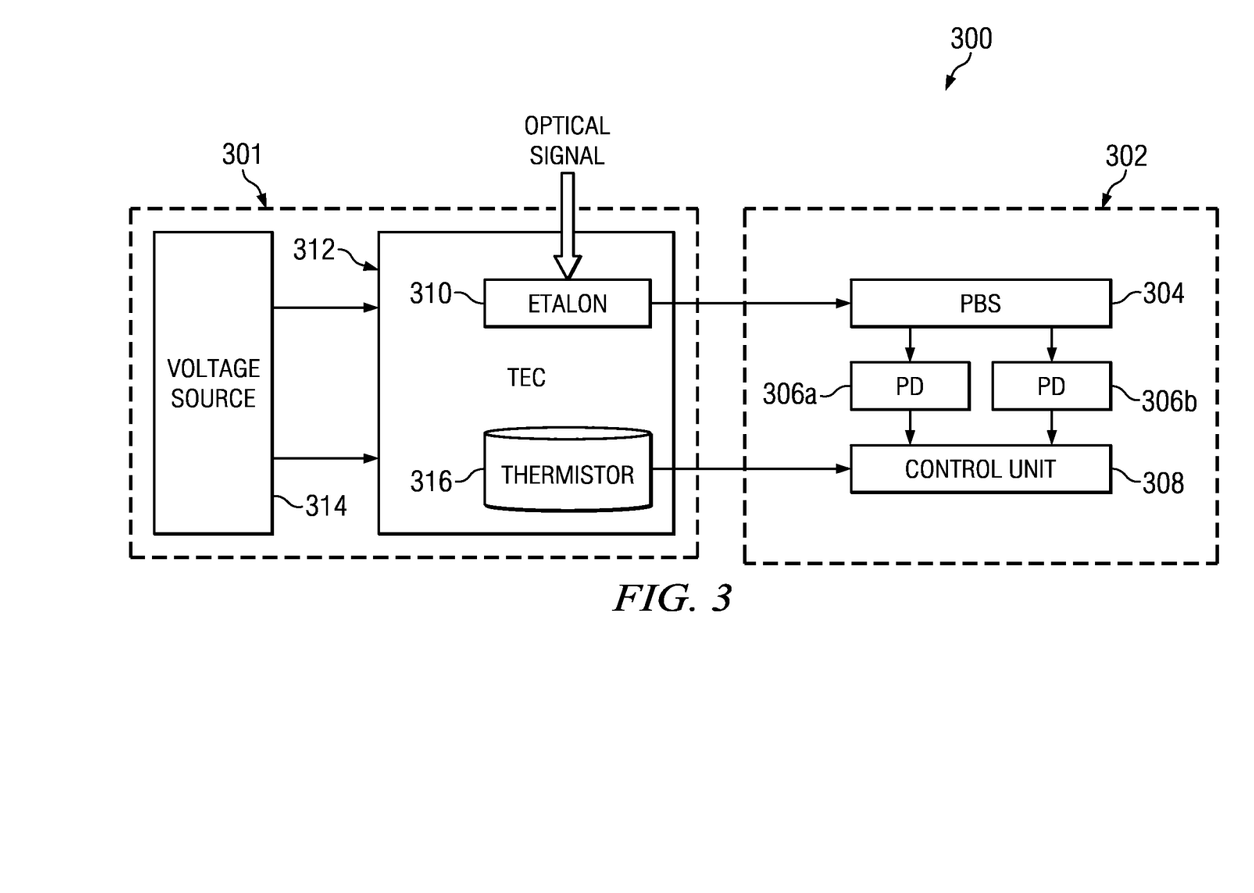
FIG. 3 is a diagram illustrating an embodiment of components for monitoring optical dispersion and optical signal parameters of optical channels.

FIG. 3 is a diagram illustrating an embodiment of an optical signal monitoring system 300, configured to monitor optical dispersion and optical signal parameters using the same elements. System 300 may include a tunable filter 301 that may be configured to perform the operations of tunable filters 34b of FIGS. 1 and 2. System 300 may also include a monitor 302 configured to perform the operations of monitor 36 of FIGS. 1 and 2.

Tunable filter 301 may comprise an etalon filter that includes an etalon 310, a temperature regulator 312, a voltage source 314 and a thermistor 316. Etalon 310 may be configured to filter a narrow portion (e.g., less than 0.06 nanometers) of an optical channel associated with an optical signal according to the temperature of etalon 310. Accordingly, etalon 310 may filter one portion of a channel at one temperature and may filter another portion of the same or a different channel at another temperature.

Temperature regulator 312 may comprise any suitable apparatus, system or device configured to control the temperature of etalon 310 and, thus, control which portion of a channel may be filtered by etalon 310. In the present embodiment, temperature regulator 312 may comprise a thermoelectric cooler (TEC) coupled to etalon 310 to change the temperature of etalon 310.

Temperature regulator 312 may be coupled to voltage source 314 and may be configured to change temperature according to the amount of voltage driving it. Therefore, voltage source 314 may be configured to control the temperature of temperature regulator 312, which in turn may control the temperature of etalon 310. Accordingly, because etalon 310 filters different portions of the channels of the WDM signal based on temperature, voltage source 314 may be configured to vary its voltage such that etalon 310 filters a desired portion of a particular channel. Voltage source 314 may be controlled by a controller such as filter controller 62 of FIGS. 1 and 2 or any other suitable device. Accordingly, voltage source 314 may be configured to vary its voltage such that the temperature of temperature regulator 312 varies and etalon 310 cycles through filtering portions of each channel to allow for dispersion monitoring and parameter monitoring for one or more channels of the WDM signal.

Tunable filter 301 may also include a thermistor 316 coupled to temperature regulator 312. Thermistor 316 may be configured to adjust its resistance based on its temperature. Accordingly, a correlation between the resistance of thermistor 316 and the filtering properties of etalon 310 may be determined such that the channel corresponding to the portion being filtered by etalon 310 may be determined based on the resistance of thermistor 316 because the temperature of thermistor 316 and the filtering properties of etalon 310 are both directly related to the temperature of temperature regulator 312. Thermistor 316 may be coupled to control unit 308 to allow control unit 308 to perform this determination as discussed further.

Monitor 302 may include a polarization beam splitter (PBS) 304, photodetectors 306a and 306b and a control unit 308. PBS 304 may be coupled to etalon 310 and may be configured to receive the filtered portion from etalon 310. PBS 304 may comprise any suitable apparatus, system or device configured to split an optical beam into two beams where each of the two beams has a single polarization state that is perpendicular to the polarization state of the other beam. These polarization states may be referred to as "horizontal" and "vertical" polarization to convey the perpendicular nature of the two with respect to each other. However, the terms "horizontal" and "vertical" may not refer to specific polarization state orientations and are merely to provide a frame of reference. In some embodiments, PBS 304 may comprise a Wollaston prism.

Photodetectors 306a and 306b may be coupled to PBS 304 such that photodetector 306a receives the horizontally polarized beam from PBS 304 and photodetector 306b receives the vertically polarized beam from PBS 304. Photodetectors 306a and 306b may comprise any suitable system, apparatus or device configured to convert the optical beams received from PBS 304 into electrical signals. In some embodiments photodetectors 306a and 306b may comprise photodiodes such as avalanche photodiodes.

Control unit 308 may be coupled to photodetectors 306a and 306b and may be configured to receive the electrical signals from photodetectors 306a and 306b. Control unit 308 may be configured to determine chromatic dispersion, PMD and the signal parameters (e.g., OSNR, power, wavelength, OSA, etc.) of the portion of the signal based on the received electrical signals.

For example, during PMD monitoring, control unit 308 may determine the PMD by comparing the horizontally polarized beams and the vertically polarized beams of a scrambled test signal transmitted at a particular channel. During CD monitoring, control unit 308 may determine the chromatic dispersion of a system by comparing test signals transmitted at various wavelengths. Further, as more optical systems modulate information onto a horizontal and a vertical polarization state of a channel, control unit 308 may advantageously determine the chromatic dispersion between the same polarization states of different channels (e.g., the chromatic dispersion of the horizontal polarization of the channels). Also, the narrow filtering done by tunable filter 301 may also contribute to dispersion of the signal, however the amount of dispersion caused by tunable filter 301 may be known and control unit 308 may be configured to compensate for this while performing the dispersion calculations.

Control unit 308 may also determine one or more signal parameters (e.g., OSNR, OSA, power) of each polarization state for each channel during parameter monitoring. In the same or alternative embodiments, control unit 308 may determine a parameter for a channel representing both horizontal and vertical polarizations of the channel by averaging the parameters for the horizontal and vertical polarizations, by determining the best parameter (e.g., lowest power) between the horizontal and vertical polarizations or by determining the worst parameter (e.g., highest power)

Control unit 308 may be coupled to thermistor 316 to determine which channel is currently being filtered by etalon 310 for dispersion and parameter monitoring. Control unit 308 may make this determination based on the resistance of thermistor 316 and the correlation between the resistance of thermistor 316 and the filtering characteristics of etalon 310 because of the temperature dependency of both thermistor 316 and etalon 310. Accordingly, control unit 308 may determine the wavelength of the portion being filtered by etalon 310 and thus, also determine which channel is being monitored. Therefore, control unit 308 may communicate information indicating the dispersion, OSNR, OSA, wavelength, power etc. of the channel. For example, control unit 308 may be coupled to TDCM 30 and, based on the dispersion measurements determined for a particular channel, control unit 308 may communicate control signals to TDCM 30. TDCM 30 may perform optical dispersion compensation on the channel based on the control signals received from control unit 308.

Modifications, additions or omissions may be made to system 300 without departing from the scope of the disclosure. For example, the functionality of control unit 308 may be performed by components not included in monitor 302, such as filter controller 62. Additionally, in some embodiments and some applications, control unit 308 may be configured to determine the particular channel being filtered by etalon 310 based on the voltage of voltage source 314 instead of the resistance of thermistor 316.

Although the present disclosure has been described with several embodiments, various changes and modifications may be suggested to one skilled in the art. It is intended that the present disclosure encompass such changes and modifications as fall within the scope of the appended claims.

What is claimed is:

1. A system for optical signal dispersion and parameter monitoring comprising:
    a tunable filter configured to receive an optical signal comprising a plurality of channels and configured to filter a portion of one channel from the plurality of channels, wherein, during dispersion monitoring, the portion includes a test signal;
    a polarization beam splitter (PBS) coupled to the tunable filter and configured to receive the portion from the tunable filter and split the portion into a first polarization beam and a second polarization beam;
    a first photodetector coupled to the PBS and configured to receive the first polarization beam from the PBS and convert the first polarization beam into a first electrical signal;
    a second photodetector coupled to the PBS and configured to receive the second polarization beam from the PBS and convert the second polarization beam into a second electrical signal; and
    a control unit coupled to the first photodetector and the second photodetector and configured to:
        receive the first and second electrical signals;
        determine optical dispersion in the portion based on the first and second electrical signals when the portion includes the test signal; and
        determine an optical signal parameter of the portion selected from the group consisting of channel power, channel wavelength, optical spectrum analysis (OSA) and optical signal-to-noise ratio (OSNR) based on the first and second electrical signals when the portion does not include the test signal.

2. The system of claim 1, wherein the tunable filter comprises an etalon filter.

3. The system of claim 1, wherein, during dispersion monitoring, the test signal is modulated according to a modulation technique and the tunable filter is tuned to filter the portion based on the test signal being modulated according to the modulation technique.

4. The system of claim 1, wherein the optical dispersion comprises at least one of chromatic dispersion and polarization mode dispersion (PMD).

5. The system of claim 1, wherein the test signal cycles through a plurality of polarization states and wherein the controller is further configured to determine polarization mode dispersion (PMD) based on the cycled polarization states of the test signal.

6. The system of claim 1, wherein the portion is less than or equal to 0.06 nanometers wide.

7. The system of claim 1, wherein the control unit is further configured to transmit control signals to a tunable dispersion compensation monitor coupled to the control unit based on the optical dispersion in the portion.

8. The system of claim 1, further comprising a temperature regulator coupled to the tunable filter and wherein the tunable filter is tunable as a function of temperature of the temperature regulator.

9. The system of claim 8, further comprising a thermistor coupled to the control unit and temperature regulator and configured to have a resistance based on temperature, wherein the control unit is further configured to determine the channel associated with the portion being filtered based on the resistance of the thermistor.

10. The system of claim 1, further comprising:
    a plurality of transmitters configured to transmit the plurality of channels;
    a tunable transmitter configured to transmit the test signal during dispersion monitoring; and
    a second tunable filter coupled to the plurality of transmitters and the tunable transmitter and, during dispersion monitoring, configured to:
        filter the portion of one channel from the plurality of channels;
        insert the test signal into the portion such that the portion includes the test signal; and
        combine the portion including the test signal with the plurality of channels.

11. The system of claim 10, further comprising a polarization controller coupled between the tunable transmitter and the second tunable filter and configured to cycle the test signal through a plurality of polarization states during polarization mode dispersion monitoring.

12. A method for optical signal dispersion and parameter monitoring comprising:
    filtering, by a tunable filter, a portion of one channel from a plurality of channels of an optical signal, wherein, during dispersion monitoring, the portion includes a test signal;
    splitting, by a polarization beam splitter (PBS) coupled to the tunable filter, the portion into a first polarization beam and a second polarization beam;
    converting, by a first photodetector coupled to the PBS, the first polarization beam into a first electrical signal;
    converting, by a second photodetector coupled to the PBS, the second polarization beam into a second electrical signal;
    determining, by a control unit coupled to the first photodetector and the second photodetector, optical dispersion based on the first and second electrical signals, when the portion includes a test signal; and
    determining, by the control unit, an optical signal parameter of the portion selected from the group consisting of channel power, channel wavelength, optical spectrum analysis (OSA) and optical signal-to-noise ratio (OSNR) based on the first and second electrical signals when the portion does not comprise the test signal.

13. The method of claim 12, wherein, during dispersion monitoring, the test signal is modulated according to a modulation technique and further comprising tuning the tunable filter to filter the portion based on the test signal being modulated according to the modulation technique.

14. The method of claim 12, wherein the optical dispersion comprises at least one of chromatic dispersion and polarization mode dispersion.

15. The method of claim 12, wherein the test signal cycles through a plurality of polarization states and further comprising determining, by the controller, polarization mode dispersion (PMD) based on the cycled polarization states of the test signal.

16. The method of claim 12, wherein the portion is less than or equal to 0.06 nanometers wide.

17. The method of claim 12, further comprising, transmitting, by the control unit, control signals to a tunable dispersion compensation monitor coupled to the control unit based on the optical dispersion in the portion.

18. The method of claim 12, further comprising tuning the tunable filter as a function of temperature of a temperature regulator coupled to the tunable filter.

19. The method of claim 18, further comprising determining, by the control unit, the channel associated with the portion being filtered based on a resistance of a thermistor coupled to the control unit and temperature regulator, wherein the resistance of the thermistor is based on temperature.

20. The method of claim 12, further comprising:
    transmitting, by a plurality of transmitters, the plurality of channels;
    transmitting, by a tunable transmitter, the test signal during dispersion monitoring;
    filtering, by a second tunable filter coupled to the plurality of transmitters and the tunable transmitter, the portion of one channel from the plurality of channels, during dispersion monitoring;
    inserting, by the second tunable filter during dispersion monitoring, the test signal into the portion such that the portion includes the test signal; and
    combining, by the second tunable filter during dispersion monitoring, the portion including the test signal with the plurality of channels.

21. The method of claim 20, further comprising cycling, by a polarization controller coupled between the tunable transmitter and the second tunable filter, the test signal through a plurality of polarization states during polarization mode dispersion monitoring.

* * * * *